(12) United States Patent
Origuchi

(10) Patent No.: US 8,279,300 B2
(45) Date of Patent: Oct. 2, 2012

(54) IMAGING DEVICE AND IMAGING METHOD

(75) Inventor: Yohta Origuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 330 days.

(21) Appl. No.: 12/690,145

(22) Filed: Jan. 20, 2010

(65) Prior Publication Data

US 2010/0188526 A1 Jul. 29, 2010

(30) Foreign Application Priority Data

Jan. 27, 2009 (JP) ................. P2009-016002

(51) Int. Cl.
*H04N 5/228* (2006.01)
(52) U.S. Cl. .................................................. 348/222.1
(58) Field of Classification Search ............... 348/221.1, 348/222.1, 229.1, 362–365, 271, 274; 396/155, 396/157, 161, 180, 237, 238; 382/274
See application file for complete search history.

(56) References Cited

U.S. PATENT DOCUMENTS

2008/0225136 A1\* 9/2008 Yamada ..................... 348/229.1

FOREIGN PATENT DOCUMENTS

| JP | 5 87631 | 4/1993 |
|---|---|---|
| JP | 5 196988 | 8/1993 |
| JP | 9 284784 | 10/1997 |
| JP | 2000 69490 | 3/2000 |
| JP | 2003 107555 | 4/2003 |
| JP | 2004 192129 | 7/2004 |
| JP | 2008 104156 | 5/2008 |
| JP | 2008 170932 | 7/2008 |
| JP | 2008 199461 | 8/2008 |
| JP | 2010 72619 | 4/2010 |

\* cited by examiner

*Primary Examiner* — Yogesh Aggarwal
(74) *Attorney, Agent, or Firm* — Frommer Lawrence & Haug LLP; William S. Frommer; Thomas F. Presson

(57) ABSTRACT

An imaging device is provided which includes a color component region detection portion that detects, from image data of a photographic subject, a region that has a same or a similar color component to a color component of a target photographic subject, an area calculation portion that calculates an area of the detected region, a luminance calculation portion that calculates luminance of the whole photographic subject and luminance of the detected region, a current luminance level determination portion that determines a current luminance level corresponding to the area of the detected region, using the luminance of the whole photographic subject and the luminance of the detected region, and an exposure amount calculation portion that calculates an amount of exposure such that the current luminance level becomes a target luminance level.

6 Claims, 13 Drawing Sheets

IMAGING DEVICE AND IMAGING METHOD

BACKGROUND OF THE INVENTION

1. Field of the Invention

The present invention relates to an imaging device and an imaging method.

2. Description of the Related Art

Some imaging devices, such as digital still cameras and video cameras etc., have an auto exposure (AE) function in which exposure is controlled based on the amount of light received. With this function, the imaging device can adjust the brightness of the photographic subject. In this case, the brightness of the photographic subject changes depending on whether the brightness is adjusted while taking the whole photographic subject as a point of reference or adjusted while taking part of the photographic subject as the point of reference (such as a face of a human subject, for example). For example, when the brightness is adjusted while taking the whole photographic subject as the point of reference, if there is a high luminance light source, such as lighting or a window, around a human subject, the human subject becomes dark, and it is difficult for a photographer to adjust to an expected appropriate brightness.

Here, in order to control exposure when photographing a human subject, it is conceivable to use, for example, face recognition technology. However, known face recognition technology is based on edge information of an image, resulting in a high computational load. Thus circuit size tends to increase.

On the other hand, technology exists in which attention is focused on the color of the photographic subject, and exposure is controlled by targeting a photographic subject that has a specific color. Technology is disclosed, for example, in Japanese Patent Application Publication No. JP-A-2004-192129, in which a light source is determined and skin color conditions are set, and then regions are detected from the image that have a hue of the skin color. Then, based on the detected regions, brightness correction and white balance correction etc. are performed such that the face of the human subject is reproduced with the appropriate brightness and color. In addition, technology is disclosed, for example, in Japanese Patent Application Publication No. JP-A-2000-69490, in which color components in an optical image are detected and an appropriate exposure value is calculated from the detected color components.

SUMMARY OF THE INVENTION

In this case, when detecting a photographic subject that has a specific color and performing exposure control, first the area of the whole area of the screen that is occupied by the photographic subject that has the specific color is detected, and then, when the detected area is larger than a predetermined area (a threshold value), it is determined that the photographic subject has been detected as a target photographic subject. When it is determined that the target photographic subject has been detected, brightness is adjusted taking the target photographic subject as the point of reference. When it is determined that the target photographic subject has not been detected, brightness is adjusted taking the whole screen as a point of reference.

However, when brightness is adjusted taking a threshold value as a point of reference in this way, when the area of the target photographic subject is in the vicinity of the threshold value, and the area value rises and falls either side of the threshold value, brightness adjustment with the target photographic subject as the point of reference and brightness adjustment with the whole screen as the point of reference is repeatedly performed. For that reason, the screen that is displayed after exposure control suddenly becomes brighter or suddenly becomes darker, resulting in flickering of the screen. As a consequence, it is difficult for a user to see the screen due to the screen flickering. Furthermore, as phenomena such as hunting arise, exposure control is unstable.

In light of the foregoing, it is desirable to provide a novel and improved imaging device and imaging method that are capable of detecting an area of a photographic subject that has a specific color and at the same time capable of stabilizing exposure control and smoothly changing the brightness of a screen displayed after exposure control without flickering.

According to an embodiment of the present invention, there is provided an imaging device including a color component region detection portion that detects, from image data of a photographic subject, a region that has a same or a similar color component to a color component of a target photographic subject, an area calculation portion that calculates an area of the detected region, a luminance calculation portion that calculates luminance of the whole photographic subject and luminance of the detected region, a current luminance level determination portion that determines a current luminance level corresponding to the area of the detected region, using the luminance of the whole photographic subject and the luminance of the detected region, and an exposure amount calculation portion that calculates an amount of exposure such that the current luminance level becomes a target luminance level.

When the area of the detected region is equal to or less than a first predetermined area, the current luminance level determination portion may determine, in correspondence with the area of the detected region, ratios of contribution of the luminance of the whole photographic subject and the luminance of the detected region, respectively, and may determine the current luminance level by using the ratios and the luminance of the whole photographic subject and the luminance of the detected region.

When the area of the detected region is equal to or greater than the first predetermined area, the current luminance level determination portion may determine the current luminance level to be the luminance of the detected region.

As the area of the detected region becomes smaller, the current luminance level determination portion may determine the ratios such that the luminance of the whole photographic subject makes an increasingly higher contribution.

When the area of the detected region is smaller than the first predetermined area and is equal to or less than a second predetermined area, the current luminance level determination portion may determine the current luminance level to be the luminance of the whole photographic subject.

The imaging device may further include a region limiting portion that limits the detected region based on distribution of the luminance of the detected region. When the area of the detected region is equal to or greater than the first predetermined area and is also equal to or greater than a third predetermined area which is larger than the first predetermined area, the current luminance level determination portion may determine the current luminance level to be luminance of the limited region.

According to another embodiment of the present invention, there is provided an imaging method including the steps of detecting, from image data of a photographic subject, a region that has a same or a similar color component to a color component of a target photographic subject, calculating an area of the detected region, calculating luminance of the whole photographic subject and luminance of the detected region, determining a current luminance level corresponding to the area of the detected region, using the luminance of the whole photographic subject and the luminance of the detected region, and calculating an amount of exposure such that the current luminance level becomes a target luminance level.

According to the present invention, while detecting an area of a photographic subject that has a specific color, exposure control can be stabilized and the brightness of a screen displayed after exposure control can be changed smoothly without flickering.

DETAILED DESCRIPTION OF THE EMBODIMENT(S)

Figure 1:
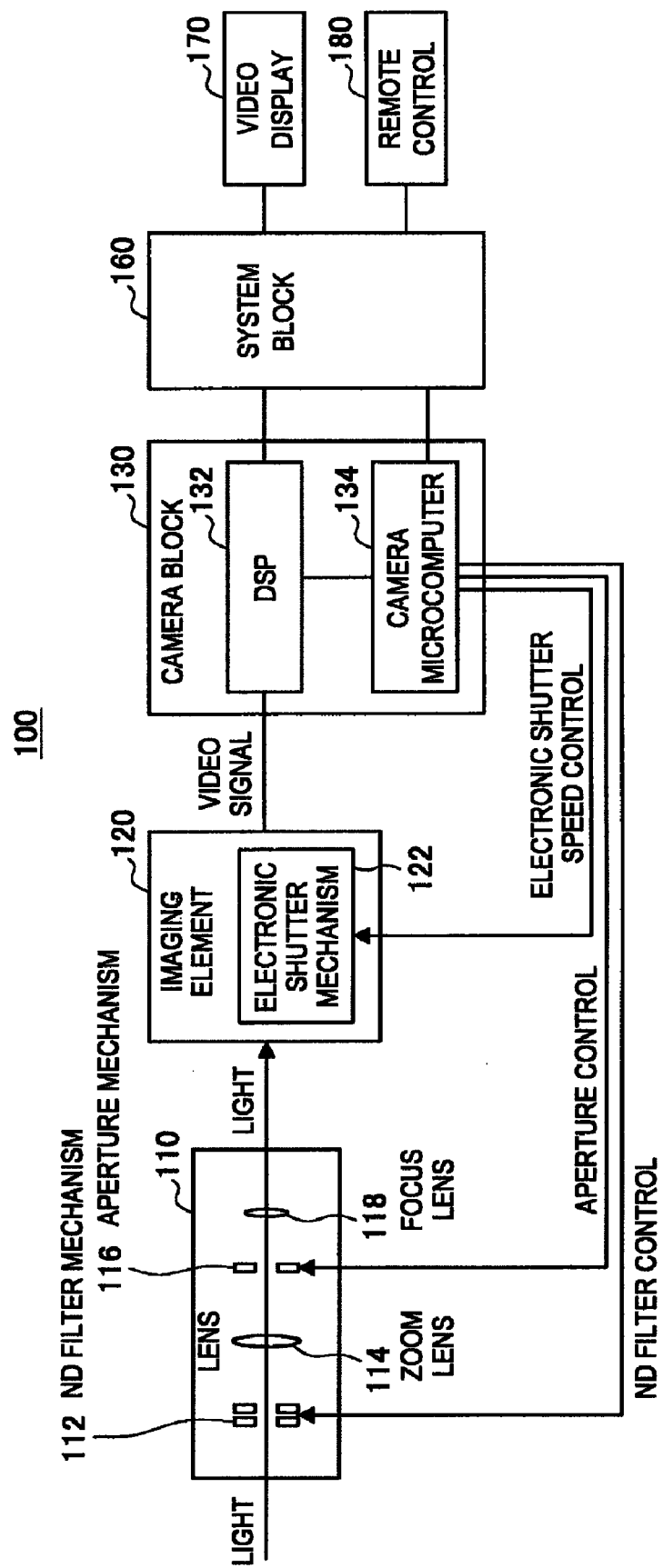
FIG. 1 is a block diagram showing an imaging device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An exemplary embodiment of the present invention will be described in detail in the following order.

1. Structure of imaging device 100 according to an embodiment.

2. Operation of imaging device 100 according to the embodiment.

1. Structure of an Imaging Device 100 According to an Embodiment

Figure 2:
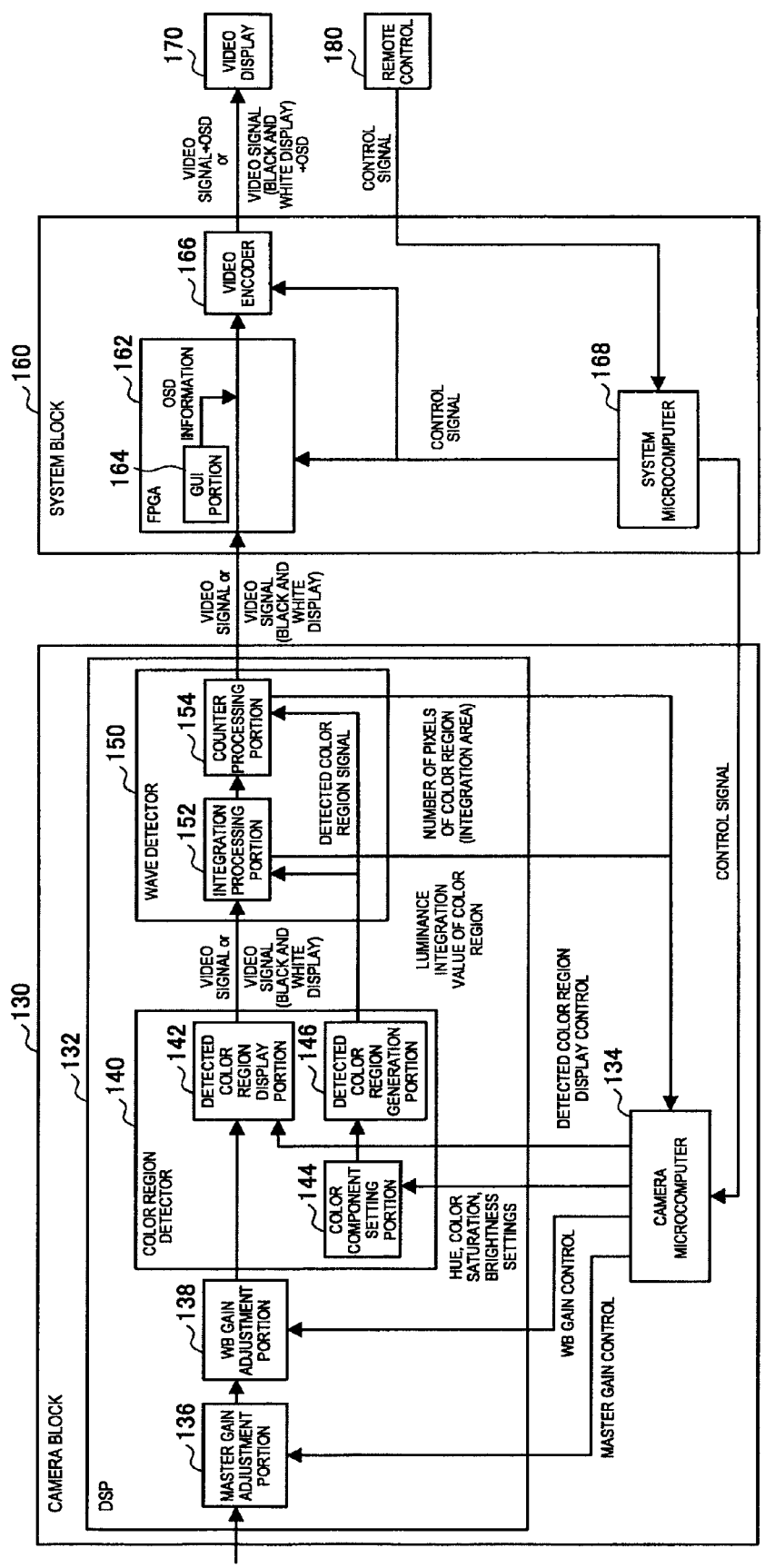
FIG. 2 is a block diagram showing a camera block and a system block according to the embodiment.

First, the structure of an imaging device 100 according to an embodiment of the present invention will be explained with reference to FIG. 1. FIG. 1 is a block diagram showing the imaging device 100 according to the present embodiment. FIG. 2 is a block diagram showing a camera block 130 and a system block 160 according to the present embodiment. The imaging device 100 according to the present embodiment is, for example, a digital still camera or a digital video camera, and can record a photographic subject as digital data.

The imaging device 100 includes, for example, a lens 110, an imaging element 120, the camera block 130, the system block 160, a video display 170 and a remote control 180.

The lens 110 allows light from the photographic subject to pass through and causes an image of the photographic subject to be formed on the imaging element 120. The lens 110 includes, for example, an ND filter mechanism 112, a zoom lens 114, an aperture mechanism 116 and a focus lens 118.

The ND filter mechanism 112 is arranged, for example, closer to the photographic subject than the zoom lens 114. The ND filter mechanism 112 reduces the amount of light entering into the lens 110. The ND filter mechanism 112 receives control signals from a camera microcomputer 134 and changes the position of an ND filter.

The zoom lens 114 changes a focal length of the lens 110 and zooms into or zooms out from the photographic subject. The aperture mechanism 116 blocks light from the photographic subject and adjusts the amount of light that reaches the imaging element 120. The aperture mechanism 116 receives control signals from the camera microcomputer 134 and changes an aperture radius. The focus lens 118 focuses the photographic subject onto the imaging element 120.

The imaging element 120 is a solid-state imaging element, such as a charge coupled device (CCD) or a complementary metal oxide semiconductor (CMOS) imaging element, and converts light entering through the lens 110 from the photographic subject into electrical signals. In addition, the imaging element 120 has an electronic shutter mechanism 122. The electronic shutter mechanism 122 receives control signals from the camera microcomputer 134 and changes the shutter speed.

The camera block 130 includes, for example, a digital signal processor (DSP) 132 and the camera microcomputer 134. The camera microcomputer 134 is, for example, a CPU, and performs overall control of the DSP 132 and the imaging device 100 as a whole by executing programs stored in a memory. Furthermore, the camera microcomputer 134 performs various computing processes to perform that control. The camera microcomputer 134 is one example of a current luminance level determination portion, and uses the luminance of the photographic subject as a whole or luminance of a detected region to determine the current luminance level corresponding to the area of the detected region. Furthermore, the camera microcomputer 134 is one example of an exposure amount calculation portion, and calculates an amount of exposure such that the current luminance level becomes the target luminance level.

The DSP 132 includes, for example, a master gain adjustment portion 136, a WB gain adjustment portion 138, a color region detector 140 and a detector 150. The master gain adjustment portion 136 acquires a master gain value that is calculated by the camera microcomputer 134, based on the amount of exposure. The master gain adjustment portion 136 adjusts the brightness of the photographic subject etc., based on the master gain value. The WB gain adjustment portion 138 acquires a WB gain value that is calculated by the camera microcomputer 134, based on color components of image data. The WB gain adjustment portion 138 adjusts the image data, based on the WB gain value.

The color region detector 140 includes a detected color region display portion 142, a color component setting portion 144 and a detected color region generation portion 146. To clearly define a region that has the same or a similar color component to a color component that has been set, the detected color region display portion 142 generates video signals such that a detected color region can be displayed on a screen. The color component setting portion 144 sets a color component that exists in the photographic subject that is targeted for detection by a user. The color component includes, for example, color palette values, color saturation values, brightness values and the respective ranges of each. The detected color region generation portion 146 is one example of a color component region detection portion, and detects, from the image data, a section that has the same or a similar color component to the set color component. The detected color region generation portion 146 generates the detected section as a detected color region signal, and outputs the signal to an integration processing portion 152 and a counter processing portion 154 of the detector 150.

The detector 150 includes the integration processing portion 152 and the counter processing portion 154. The detector 150 performs detection, for example, for auto exposure (AE). The integration processing portion 152 is one example of a luminance calculation portion, and calculates a luminance integration value of the detected color region, based on the luminance value of the detected color region signal. The integration processing portion 152 outputs the calculated luminance integration value to the camera microcomputer 134. The counter processing portion 154 is one example of an area calculation portion, and counts a number of pixels in the detected color region, based on the detected color region signal. The integration area of the detected color region is calculated in this way. The counter processing portion 154 outputs the calculated integration area to the camera microcomputer 134.

The system block 160 includes a field programmable gate array (FPGA) 162, a video encoder 166, and a system microcomputer 168. The FPGA 162 includes a GUI portion 164. The GUI portion 164 generates onscreen display (OSD) information.

The video encoder 166 generates video signals for monitor display, based on the image data, and outputs the video signals to the video display 170. The system microcomputer 168 is, for example, a CPU, and performs overall control of the system block 160 as a whole by executing programs stored in a memory. Furthermore, the system microcomputer 168 performs various computing processes to perform that control.

The video display 170 is, for example, a liquid crystal display or an organic EL display that is provided in the imaging device 100. The video display 170 displays video obtained from video signals. The video display 170 does not only display the photographic subject, but also displays, for example, a menu screen or displays the detected color region and so on.

The remote control 180 is operated by the user, and generates control signals corresponding to content of the operation. The remote control 180 outputs the generated control signals to the system microcomputer 168.

2. Operation of Imaging Device 100 According to the Embodiment

Figure 3:
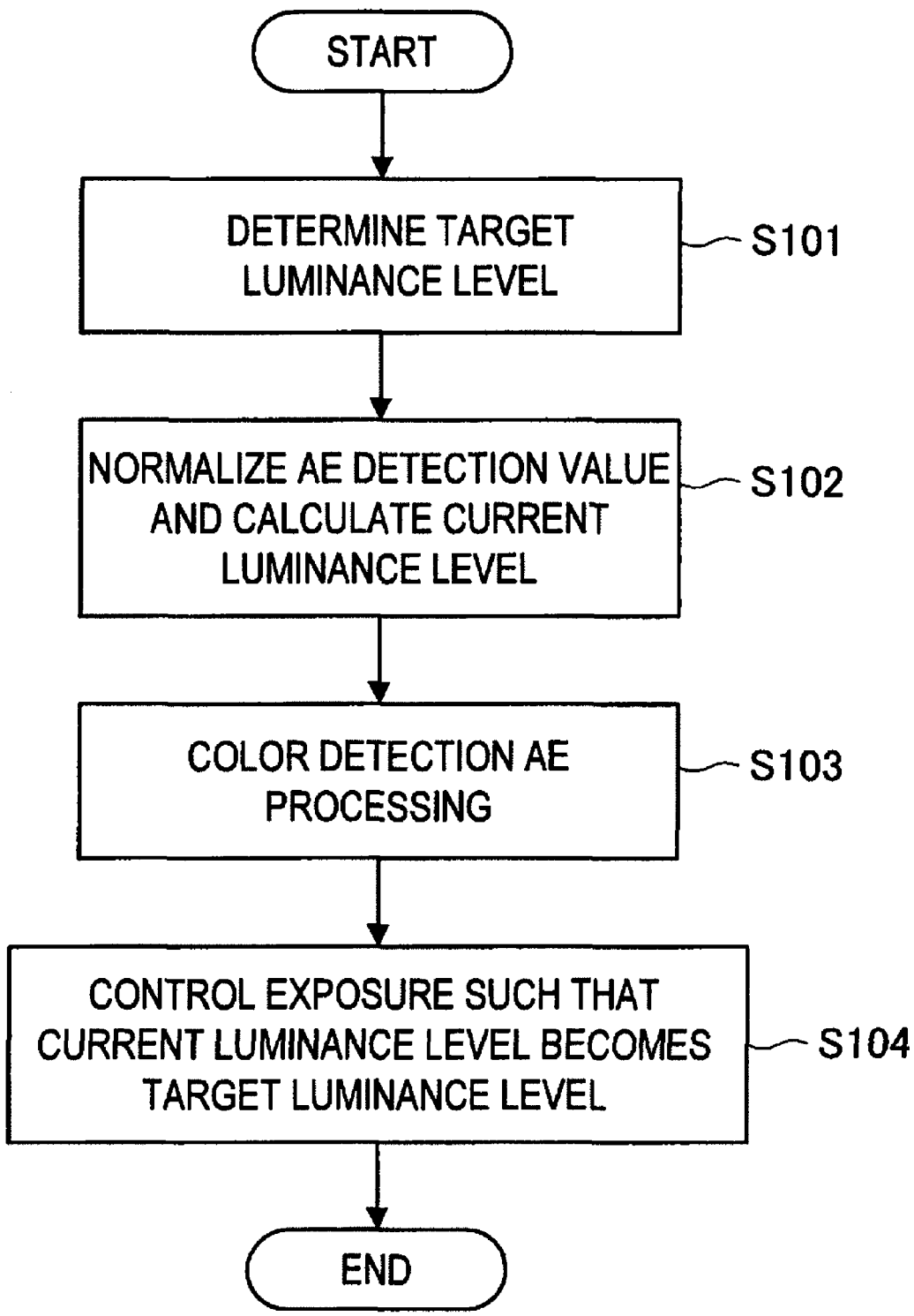
FIG. 3 is a flow chart showing an AE processing operation of the imaging device according to the embodiment.

Next, an AE processing operation of the imaging device 100 according to the present embodiment will be explained with reference to FIG. 3. FIG. 3 is a flow chart showing an AE processing operation of the imaging device 100 according to the present embodiment.

When photographing the photographic subject, auto exposure (AE) of the imaging device 100 is performed in order to obtain an appropriate brightness of the photographic subject. First, in the imaging device 100, a target luminance level is determined (step S101). A value of the target luminance level varies depending on how bright the target photographic subject is to be made. The target luminance level may be constant, or may be determined in accordance with the scene being photographed. The scene being photographed may be selected by the user, or may be determined from obtained image data.

Next, a luminance value is obtained from image data, and an AE detection value is calculated based on the obtained luminance value. The AE detection value is calculated while taking the luminance of the whole photographic subject as a point of reference. At this time, the calculated AE detection value of the whole photographic subject is normalized, and is first calculated as the current luminance level (step S102). Here, normalization of the AE detection value means calculation of a luminance level that is not dependent on a detection area. In other words, normalization is a process by which an integration value obtained by adding up luminance for each pixel is divided by the number of integrated pixels, and luminance levels can be equally compared regardless of the detection area and the number of integrated pixels. In a different AE operation mode, an area to obtain the AE detection value is varied. For example, in a mode in which a spotlight is searched for and auto exposure is performed, the AE detection value is obtained from an area that is one ninth of the normal detection area. In a color detection AE process that will be explained later, the AE detection value is obtained in a color region area. Further, when a video signal format is different, for example, in a 1920×1080 mode and a 1280×720 mode, even though the detection area on the monitor appears to be the same, the number of integrated pixels from which the AE detection value can be obtained differs. By normalizing the AE detection value in this way, regardless of differences in the detection area due to the AE operation mode or of differences in the video signal format, the AE value can be handled in the same way.

Following normalization, the color detection AE process is performed (step S103). In the color detection AE process, a region having a specific color component is detected from image data, and the current luminance level is detected using a luminance level of the detected color region and a luminance level of the whole photographic subject. The specific color component is a color component of the target photographic subject. For example, when a face is being detected, the color component is skin color etc. The color detection AE process will be explained in more detail later. Note that, depending on an area value of the detected color region, it is difficult to perform the color detection AE process in some cases. In such cases, the current luminance level calculated at step S102 is maintained.

Next, exposure control is performed (step S104), such that the current luminance level calculated at step S103 becomes the target luminance level determined at step S101. In exposure control, for the luminance level to become the calculated target luminance level, gain, an aperture opening value and shutter speed, for example, are adjusted.

Through the above-described operation, the AE processing operation is performed based on the image data of the photographic subject. In addition, in the present embodiment, the color detection AE process is performed with reference to a region that has a specific color component.

Figure 4:
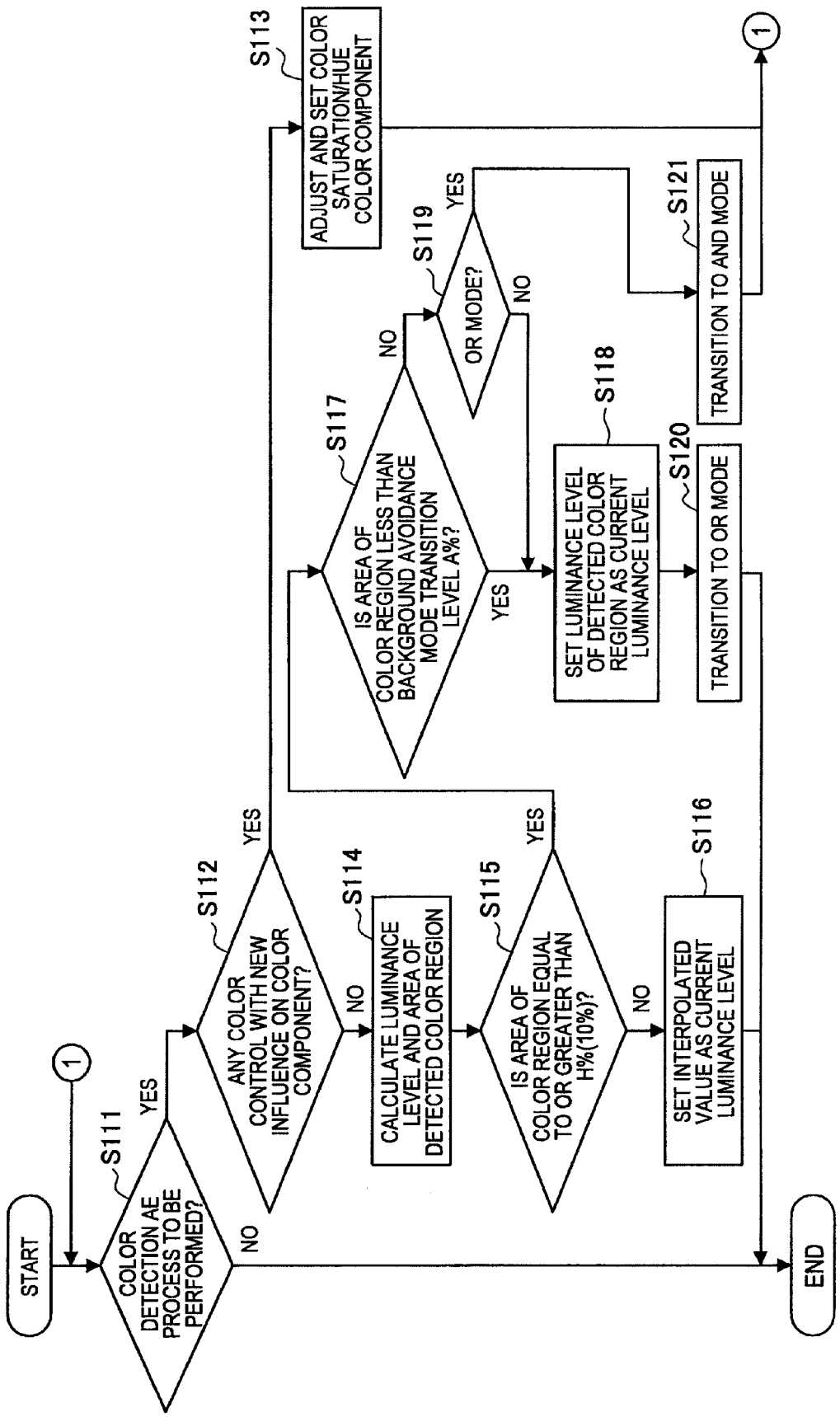
FIG. 4 is a flow chart showing a color detection AE processing operation of the imaging device according to the present embodiment.

Next, the color detection AE processing operation of the imaging device 100 according to the present embodiment will be explained with reference to FIG. 4. FIG. 4 is a flow chart showing the color detection AE processing operation of the imaging device 100 according to the present embodiment.

Figure 9:
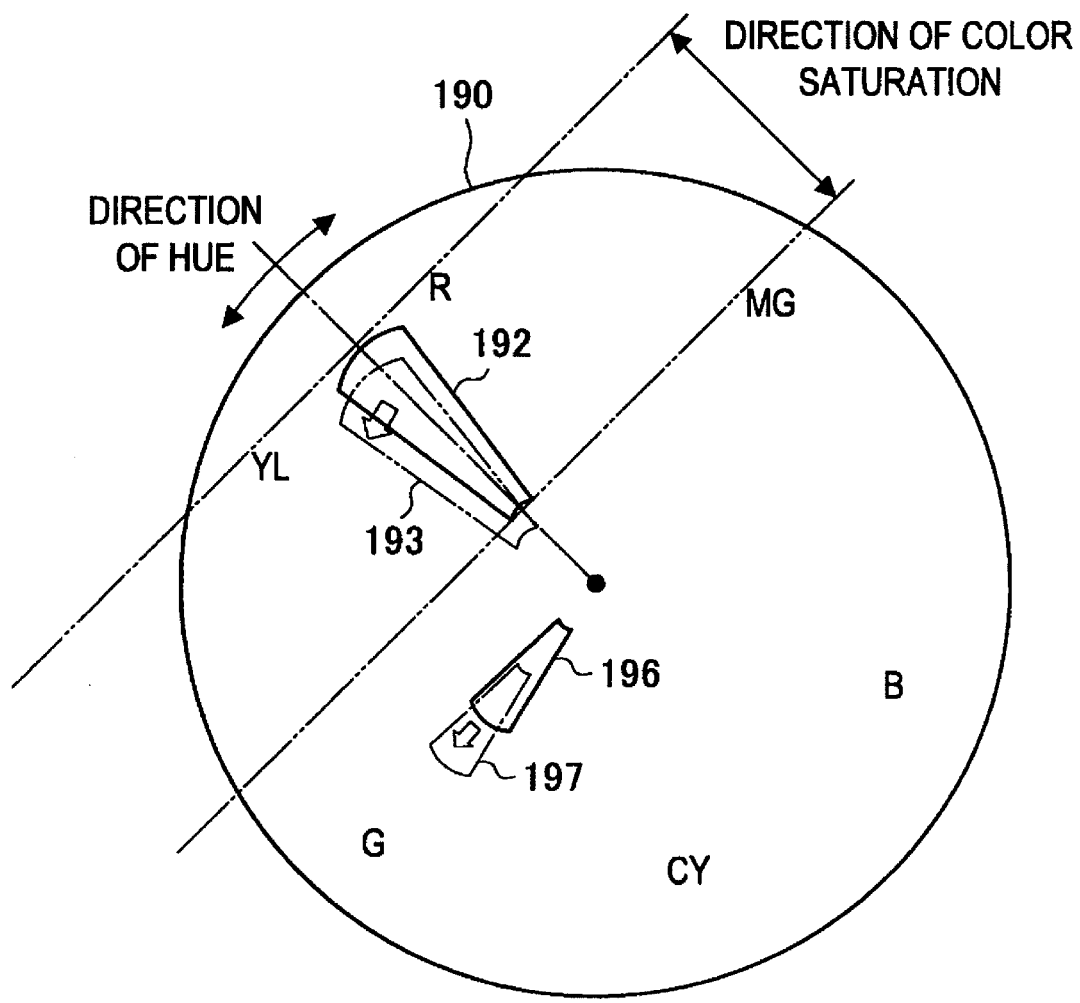
FIG. 9 is an explanatory diagram showing a hue/color saturation chart for a given luminance.

First, it is determined whether or not the color detection AE process will be performed (step S111). When the color detection AE process is not to be performed, the luminance level of the whole photographic subject (namely, the whole image) becomes the current luminance level, and exposure control is performed such that the luminance level of the whole photographic subject becomes the target luminance level. When the color detection AE process is to be performed, the color component of the target photographic subject is set. For example, when a face of a human subject is the target, a skin color component is set. The example described here is of a color component set in FIG. 9. FIG. 9 is an explanatory diagram showing a hue/color saturation chart 190 for a given luminance. The color component is defined by hue, color saturation and luminance values. A given color component is displayed, for example, as a color component 192 shown in the hue/color saturation chart 190.

In addition, when the color detection AE process is to be performed, it is determined whether or not color control that will have a new influence on the set color component will be performed (step S112). Color control is, for example, a function of the imaging device 100 and is a control that adjusts the color of the photographic subject. When color control is performed, for example, the color saturation and hue of the initially set color component is adjusted, and a new color component is set (step S113). When the color saturation and hue of the color component are adjusted, the color component 192 moves to another color component on the hue/color saturation chart 190, as shown in FIG. 9. For example, if a green (G) component of the color component 192 is intensified, distribution of the hue and color saturation of the color component 192 moves in a direction of green (G), and the color component 192 becomes a color component 193. Similarly, if the green (G) component of a color component 196 is intensified, distribution of the color saturation of the color component 196 moves in a direction of green (G) and the color component 196 becomes a color component 197.

At step S113, after the color saturation and the hue of the color component have been adjusted, the process returns once more to step S111, and it is once more determined whether or not the color detection AE process will be performed (step S111) and then determined whether or not color control that will have a new influence on the set color component will be performed (step S112).

Next, a color region that has a same or a similar color component to the set color component is detected from image data of the photographic subject. Then, the luminance level of the detected color region and the area of the detected color region are calculated (step S114). For example, when the color component 192 shown in FIG. 9 is set, a color component with the same range of hue values and color saturation values as the color component 192 is detected from the image data, and a section that has the detected color component is detected as the color region. The luminance level and the area of the detected color region are then calculated.

It is next determined whether or not a ratio of the area of the detected color region to the area of the whole photographic subject is equal to or greater than a predetermined threshold (here, H %) (step S115). When the detected color region is less than H %, an interpolated value that is calculated using the luminance of the whole photographic subject and the luminance of the detected color region is set as the current luminance level (step S116). The interpolated value is determined in accordance with the ratio of the area of the detected color region to the area of the whole photographic subject. Calculation of the interpolated value will be explained later.

On the other hand, when the ratio of the area of the detected color region to the area of the whole photographic subject is equal to or greater than H %, it is determined whether or not the ratio of the detected color region to the area of the whole photographic subject is less than a level (here A %) at which transition is made to a background avoidance mode (step S117).

When the ratio is less than the background avoidance mode transition level A %, transition is not made to the background avoidance mode and the luminance level of the detected color region is set as the current luminance level (step S118).

On the other hand, when the ratio is equal to or greater than the background avoidance mode transition level A %, it is determined whether or not the detection of the color region is an OR mode or an AND mode (step S119). Here, the OR mode is a mode in which, when a plurality of color components have been set, a color region corresponding to one of the color components is detected. Meanwhile, the AND mode is a mode in which, when a plurality of color components have been set, color regions corresponding to all the color components are detected.

At step S119, when it is determined that the AND mode, and not the OR mode, is being used, the color region is detected by the AND mode (namely, the background avoidance mode). Then, the luminance level of the color region detected using the AND mode is set as the current luminance level (step S118).

For example, as the range of the luminances among the set color components is narrowed down by using the AND mode, photographic subjects with different luminances can be differentiated. For example, when the photographic subject that is desired to be detected is a face of a human subject, if a color component that is close to the face of the human subject exists in the background, the area of the detected region becomes larger. In the present embodiment, if the area of the detected color region is equal to or greater than the ratio of A % of the area of the whole photographic subject, transition is made to the background avoidance mode. If the luminance of the human face is different to the luminance of the background, by narrowing down the range of the luminances among the set color components, the face of the human subject can be detected. Note that, the ranges of hue and color saturation among the set color components may be narrowed down using the AND mode. The background avoidance mode will be explained in more detail later.

Following step S118, transition is made to the OR mode from the AND mode (step S120).

On the other hand, when it is determined at step S119 that the OR mode is being used, in order to move to the background avoidance mode, transition is made to the AND mode (step S121). Following this transition, the process returns once more to step S111 and when, at step S115, the area of the detected color region is equal to or greater than the ratio of H % of the area of the whole photographic subject, the color region is detected using the AND mode.

Calculation of Interpolated Value

Figure 10:
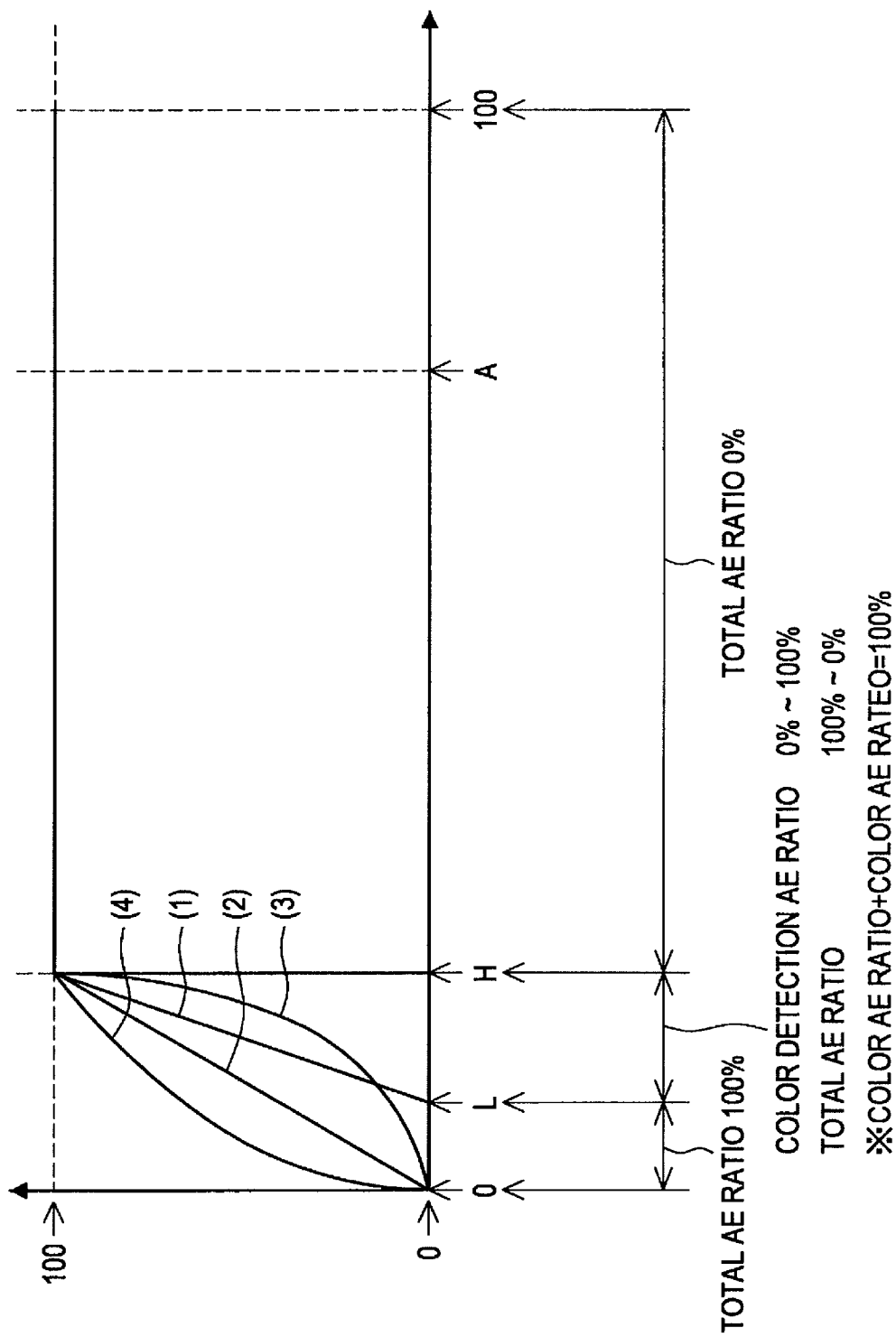
FIG. 10 is a graph showing a relationship between a ratio of contribution of the luminance of the detected color region to the calculation of the current luminance level and a ratio of the area of the detected color region to the area of the whole photographic subject.

Next, calculation of the interpolated value in the above-described step S116 will be explained with reference to FIG. 10. FIG. 10 is a graph showing a relationship between a ratio of contribution of the luminance of the detected color region to the calculation of the current luminance level and a ratio of the area of the detected color region to the area of the whole photographic subject. The vertical axis indicates the ratio of contribution of the luminance of the detected color region to the calculation of the current luminance level. The horizontal axis indicates the ratio of the area of the whole photographic subject that is occupied by the detected color region.

First, a relationship (1) shown in FIG. 10 will be explained.

When the ratio of the area of the detected color region to the area of the whole photographic subject is equal to or less than the ratio of L %, the luminance of the whole photographic subject (100%) is determined as the current luminance level. In this case, the luminance of the detected color region does not contribute at all to the luminance level (0%). Therefore, when the photographic subject that is the target of detection (a face of a human subject, for example) is relatively small with respect to the whole photographic subject, auto exposure is not performed by taking the target photographic subject as the point of reference, and auto exposure is performed taking the whole photographic subject as the point of reference.

In addition, when the ratio of the area of the detected color region to the area of the whole photographic subject is equal to or greater than the ratio of H %, the luminance of the detected color region (100%) is determined as the current luminance level. In this case, the luminance of the whole photographic subject does not contribute at all to the luminance level (0%). Therefore, when the photographic subject that is the target of detection is relatively large with respect to the whole photographic subject, auto exposure is not performed by taking the whole photographic subject as the point of reference, and auto exposure is performed by taking the target photographic subject as the point of reference.

Then, when the detected color region is equal to or greater than L % and equal to or less than H %, the current luminance level is determined using the luminance of the whole photographic subject (a whole area AE detection value) and the luminance of the detected color region (a color AE detection value). The ratios of contribution of the luminance of the whole photographic subject (the whole area AE detection value) and the luminance of the detected color region (the color AE detection value) to the determination of the current luminance level are determined in accordance with the ratio of the area of the detected color region to the area of the whole photographic subject. The ratios are expressed by the following expression.

Current luminance level=whole area AE detection value×(1−α)+color AE detection value×α

Here, α is a coefficient corresponding to the ratio of the area of the detected color region to the area of the whole photographic subject and is expressed in the following expression.

α={CS−(TS×L÷100)}÷(TS×H÷100)(0≦α≦1)

In other words, with respect to an area of H % of a whole area TS of an AE detection area (=TS×H÷100), α is a ratio occupied by an area obtained by subtracting an area of L % of TS (=TS×L÷100) from an area CS of the detected color region.

In this way, the ratio of the contribution of the luminance of the detected color region to the determination of the current luminance level increases as the area of the detected color region increases.

Next, a relationship (2) shown in FIG. 10 will be explained.

The relationship (2) in FIG. 10 shows a case in which L in the relationship (1) is 0%. When the ratio of the area of the detected color region to the area of the whole photographic subject is equal to or greater than the ratio of H %, this relationship is the same as in the above-described relationship (1).

Then, when the detected color region is equal to or greater than 0% and equal to or less than H %, the current luminance level is determined using the luminance of the whole photographic subject (the whole area AE wave detection value) and the luminance of the detected color region (the color AE detection value). The ratios of contribution of the luminance of the whole photographic subject (the whole area AE detection value) and the luminance of the detected color region (the color AE detection value) to the determination of the current luminance level are determined in accordance with the ratio of the area of the detected color region to the area of the whole photographic subject. The ratios are expressed by the following expression.

Current luminance level=whole area AE detection value×(1−α)+color AE detection value×α

Here, α is a coefficient corresponding to the ratio of the area of the detected color region to the area of the whole photographic subject and is expressed in the following expression.

α=CS÷(TS×H÷100)(0≦α≦1)

Next, relationships (3) and (4) shown in FIG. 10 will be explained.

In the relationships (1) and (2) shown in FIG. 10, the ratio of contribution of the luminance of the detected color region to the current luminance level and the ratio of the area of the detected color region to the area of the whole photographic subject are described in terms of a linear relationship, but they may also be a non-linear relationship. In the relationships (3) and (4) shown in FIG. 10, L is 0%.

When the detected color region is equal to or greater than 0% and equal to or less than H %, the current luminance level is determined using the luminance of the whole photographic subject (the whole area AE detection value) and the luminance of the detected color region (the color AE detection value). The ratios of contribution of the luminance of the whole photographic subject (the whole area AE detection value) and the luminance of the detected color region (the color AE detection value) to the determination of the current luminance level are determined in accordance with the ratio of the area of the detected color region to the area of the whole photographic subject. The ratios are expressed by the following expression.

Current luminance level=whole area AE detection value×(1−β)+color AE detection value×β

β is expressed by the following expression. (3) in FIG. 10 is

β=α×α while (4) in FIG. 10 is

β=√α    [Formula 1]

The above-described α is expressed by the following expression.

α=CS÷(TS×H÷100)(0≦α≦1)

In this way, in the example of (3), as the ratio of the area of the detected color region to the area of the whole photographic subject increases from zero, the luminance of the detected color region gradually contributes to the calculation of the current luminance level. Further, in the example of (4), as the ratio of the area of the detected color region to the area of the whole photographic subject increases from zero, the luminance of the detected color region immediately contributes to the calculation of the current luminance level.

Background Avoidance Mode

Figure 11:
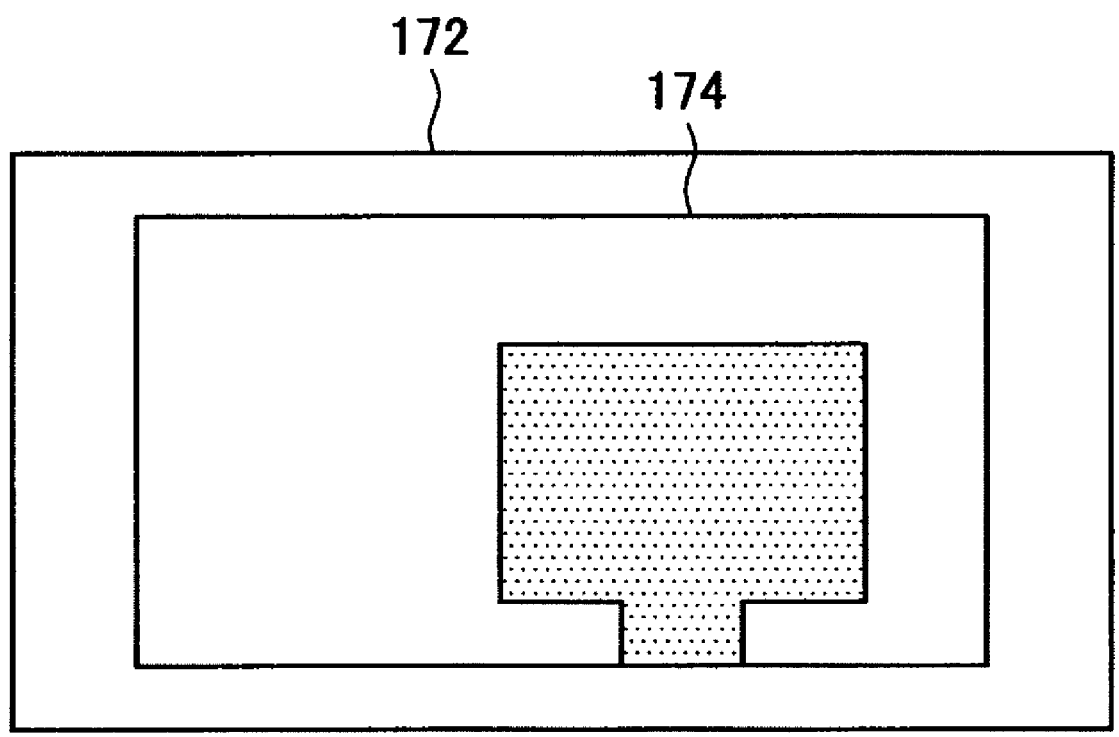
FIG. 11 is an explanatory diagram showing an image frame and a detection area inside the image frame.
Figure 12A:
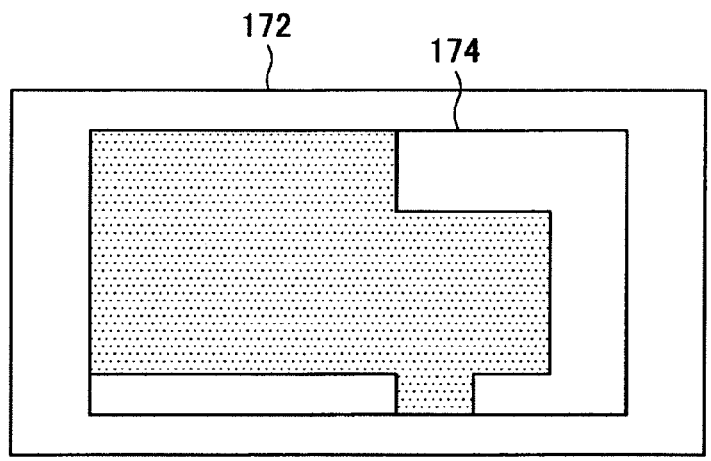
FIG. 12 is an explanatory diagram showing the image frame and the detection area inside the image frame.
Figure 12B:
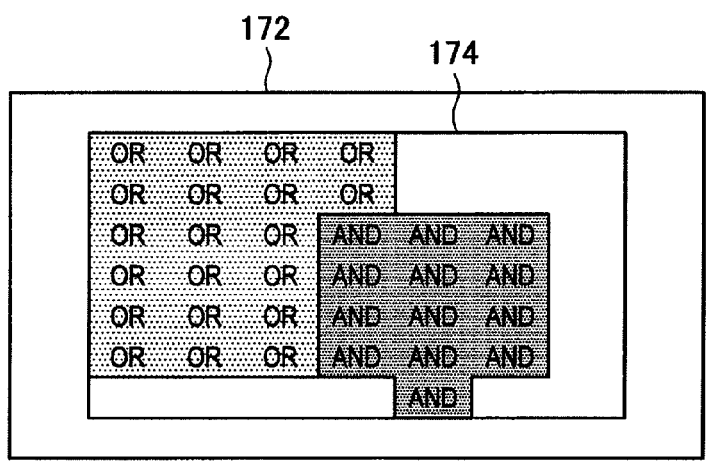
Figure 12C:
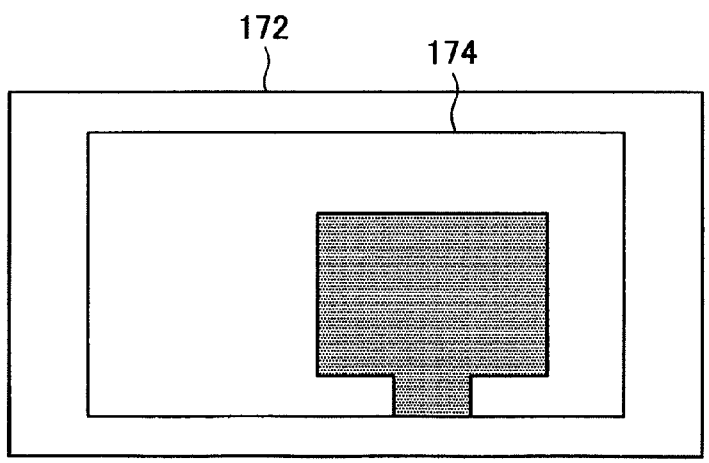
Figure 13A:
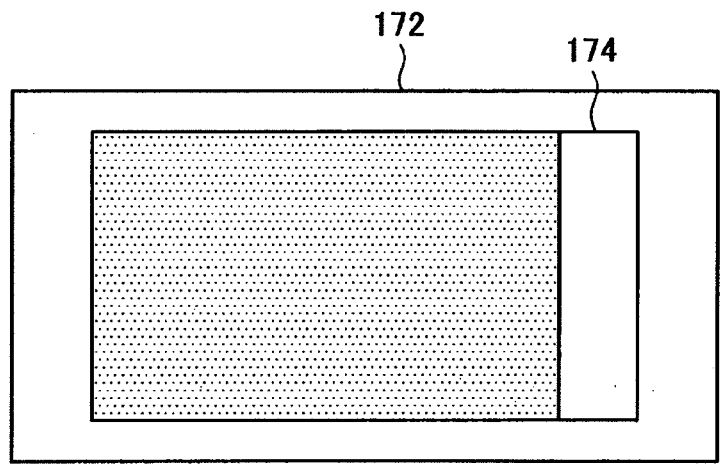
FIG. 13 is an explanatory diagram showing the image frame and the detection area inside the image frame.
Figure 13B:
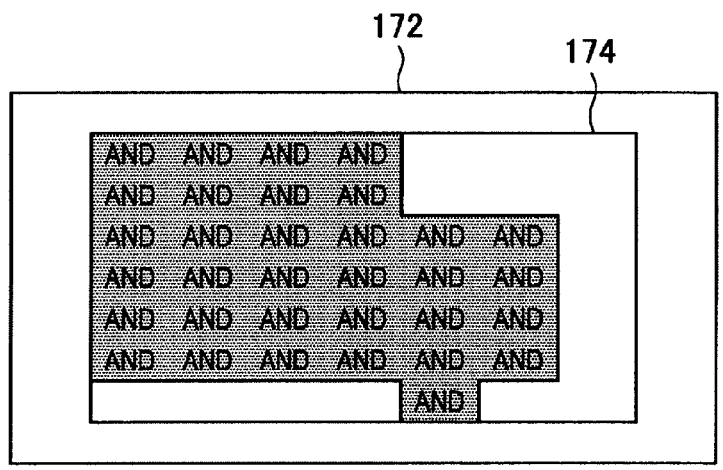
Figure 13C:
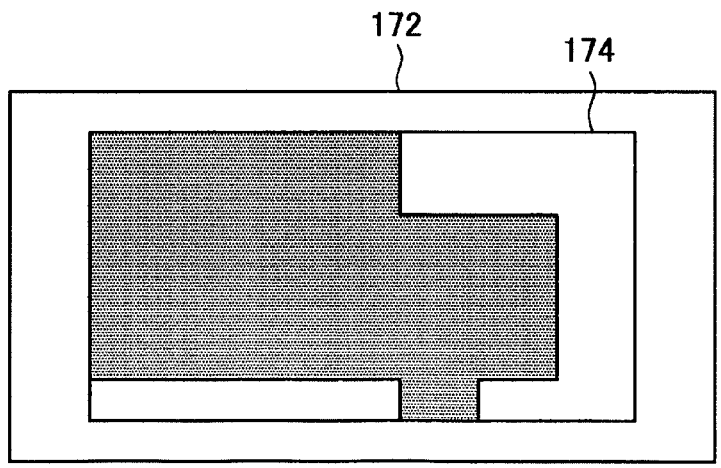

Next, the background avoidance mode according to the present embodiment will be explained with reference to FIG. 11 to FIG. 13. FIG. 11 to FIG. 13 are explanatory diagrams showing an image frame 172 and a detection area 174 inside the image frame 172.

First, as shown in FIG. 11, a case is assumed in which a same or similar color component is distributed in a shaded section. In this case, if it is assumed that the color component of the shaded section is in the same range or a similar range of the hue and color saturation of the color component of the target photographic subject, if the shaded section can be detected, the color detection AE process can be performed by calculating the luminance of that section.

Furthermore, if the area of the shaded section is calculated and it is found that the ratio of the area of the shaded section to the area of the whole photographic subject is less than the level at which transition is made to the background avoidance mode (here, A %), it is determined that there is no photographic subject (wallpaper, for example) in the background that has the similar or the same color component as the target photographic subject (a face of a human subject, for example).

On the other hand, if the area of the shaded section is calculated and it is found that the ratio of the area of the shaded section to the area of the whole photographic subject is equal to or greater than the level at which transition is made to the background avoidance mode (here, A %), it is determined that there is a possibility that there is a photographic subject (wallpaper, for example) in the background that has the same or the similar color component as the target photographic subject (a face of a human subject, for example). In this case, in the background avoidance mode, transition is made from the OR mode to the AND mode. By using the AND mode to narrow down the range of the luminances among the set color components, photographic subjects with different luminances can be differentiated.

For example, as shown in (A) in FIG. 12, a case is assumed in which a same or similar color component is distributed in a shaded section. In the OR mode, the distribution of the same or similar color component is detected as shown in (A) in FIG. 12. Then, by transitioning to the AND mode and limiting the range of the luminance, the photographic subject can be defined as a dark shaded section, as shown in (B) in FIG. 12. In this way, even if a photographic subject in the background (wallpaper, for example) has the same or the similar color component as the target photographic subject (a face of a human subject, for example), it is possible to differentiate the target photographic subject from the background, which has a different luminance.

Following this, the area of the dark shaded section shown in (C) in FIG. 12 is calculated, and if the ratio of the area of the dark shaded section to the area of the whole photographic subject is less than the ratio at which transition is made to the background avoidance mode (here, A %), transition is not made once more to the background avoidance mode, and the luminance level of the detected color region can be set as the current luminance level.

Further, a case is assumed in which a same or similar color component is distributed in a shaded section, as shown in (A) in FIG. 13.

In the OR mode, the distribution of the same or similar color component is detected as shown in (A) in FIG. 13. Then, by transferring to the AND mode and limiting the range of the luminance, the photographic subject can be identified as a dark shaded section as shown in (B) in FIG. 13. This is, for example, when the photographic subject is a face of a human subject that is pictured in close up, or a case in which the face of the human subject and the background have a same or similar color component and a similar luminance.

Following this, in the present embodiment, the luminance level of the color region detected by the AND mode is set as the current luminance level. In this way, the color detection AE process can be performed even when the photographic subject, such as a face of a human subject, is pictured in close up. Furthermore, the color detection AE process can be performed even when the face of the human subject and the background have a same or similar color component and a similar luminance in the AND mode. If the luminance of the background does not significantly differ from the luminance of the face of the human subject, the face of the human subject and the background are detected together and, as no problem arises even if the color detection AE process is performed, an appropriate AE process can be performed through the above-described series of operations.

Screen Display

Next, an image of brightness displayed on a screen as a result of exposure control will be explained with reference to FIG. 5 to FIG. 8. FIG. 5 to FIG. 8 are explanatory diagrams showing photographic subjects.

Figure 5:
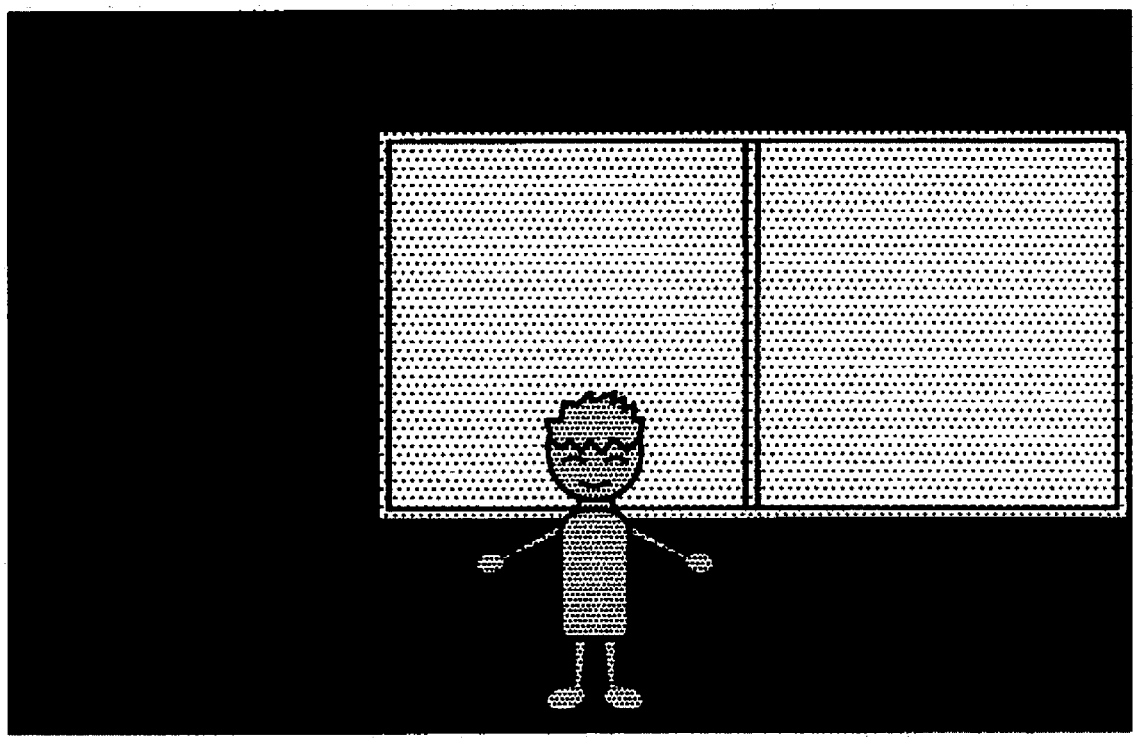
FIG. 5 is an explanatory diagram showing a photographic subject.

FIG. 5 is an image of a case in which the auto exposure process is performed while taking the luminance of the photographic subject as the point of reference. As a window in the background of a person has a high luminance, exposure control is performed in an attempt to make the whole photographic subject darker, and the face of the human subject therefore becomes dark.

Figure 6A:
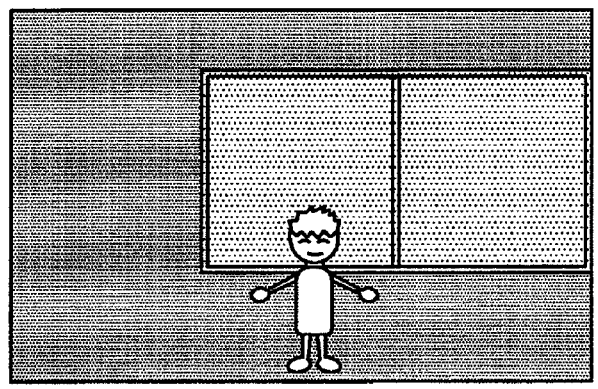
FIG. 6 is an explanatory diagram showing a photographic subject.
Figure 6B:
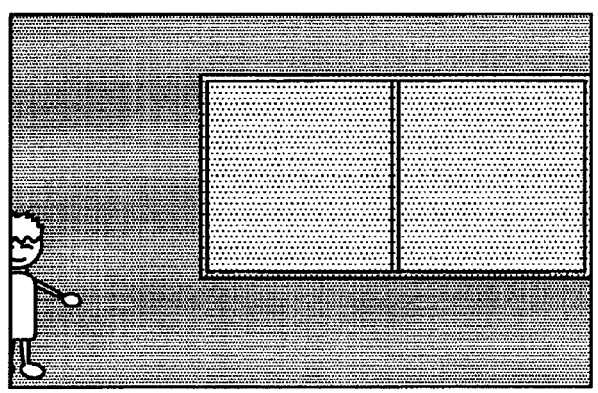
Figure 6C:
Figure 7A:
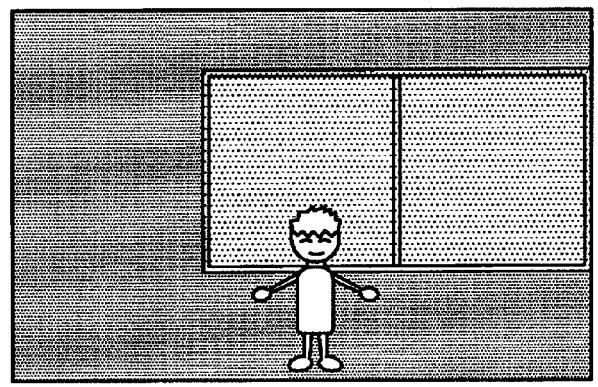
FIG. 7 is an explanatory diagram showing a photographic subject.
Figure 7B:
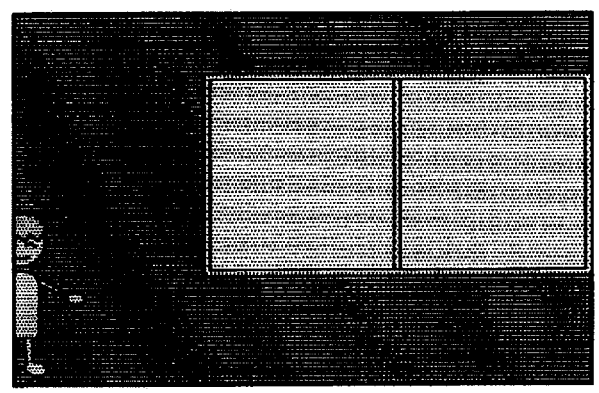
Figure 7C:
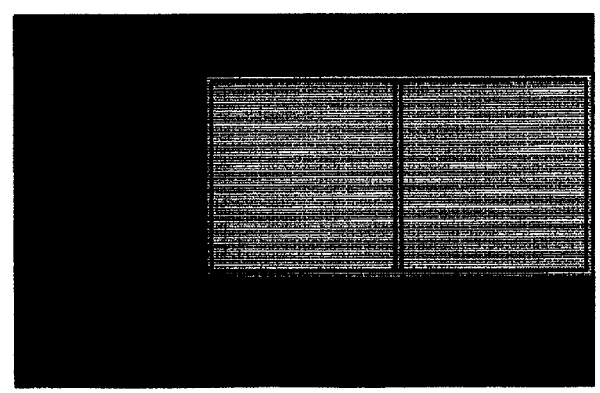
Figure 8A:
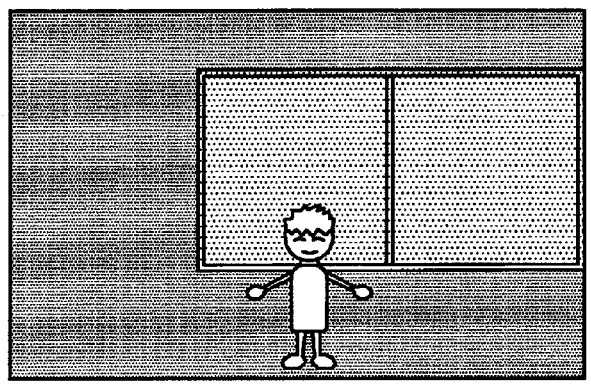
FIG. 8 is an explanatory diagram showing a photographic subject.
Figure 8B:
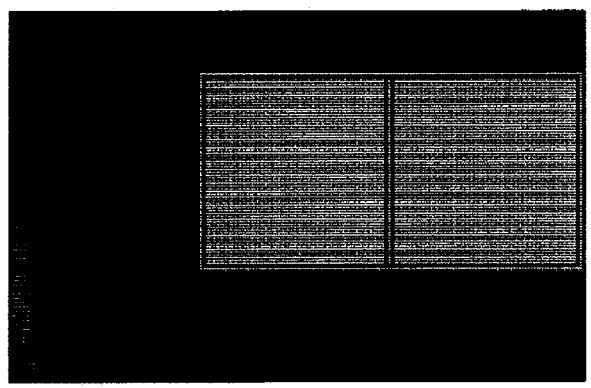
Figure 8C:
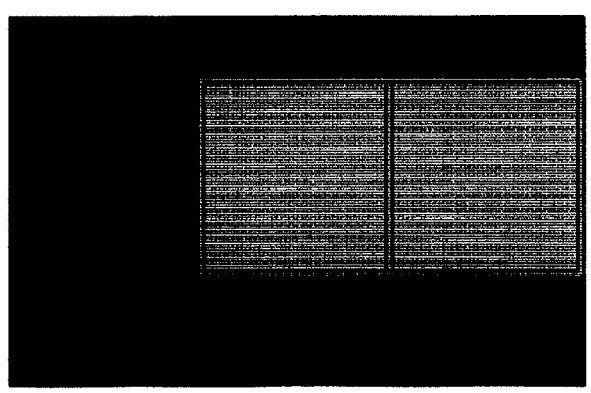

FIG. 6 to FIG. 8 are images of cases in which the auto exposure process is performed while taking the color component of the photographic subject (the color of a human face (skin color), for example) as the point of reference. By a person moving within the screen (the detection area), the area of a region that has a same or a similar color component to that of the target photographic subject changes.

First, a case will be explained with reference to FIG. 7, in which a range of the set color component is a standard size. (A) in FIG. 7 is an example of a case in which the area of the detected color region is equal to or greater than the ratio H % of the area of the whole photographic subject. In this case, the luminance of the region of the face of the human subject is set as the current luminance level. Then, as exposure control is performed such that the luminance of the region of the face of the human subject becomes the target luminance level, adjustment is performed to make the person an appropriate brightness.

(B) in FIG. 7 is an example of a case in which the area of the detected color region is equal to or greater than the ratio L % and equal to or less than the ratio H % of the area of the whole photographic subject. In this case, the current luminance level is determined using an interpolated value obtained using the luminance of the whole photographic subject (the whole area AE detection value) and the luminance of the detected color region (the color AE detection value). (C) in FIG. 7 is an example of a case in which the area of the detected color region is equal to or less than the ratio L % of the area of the whole photographic subject. In this case, the luminance of the whole photographic subject is determined to be the current luminance level. As the window has a high luminance, the photographic subject as a whole is dark.

In this way, in the present embodiment, even if the area of the detected color region increases or decreases, as the current luminance level is determined using an interpolated value, it is not necessary to repeat an operation by which brightness is adjusted taking the target photographic subject as the point of reference and then taking the whole screen as the point of reference. As a result, a screen that is displayed after exposure control does not suddenly become lighter or suddenly become darker, and flickering of the screen can be suppressed. Moreover, exposure control can be stabilized.

Next, a case will be explained with reference to FIG. 6 in which a range of the set color component is a standard size. Further, a case will be explained with reference to FIG. 8 in which a range of the set color component is narrower than a standard size. In the cases in FIG. 6 and FIG. 8, also, although not shown in the figures, when the detected color region is equal to or greater than the ratio L % and equal to or less than the ratio H % of the area of the whole photographic subject, the current luminance level is determined using an interpolated value obtained from the luminance of the whole photographic subject (the whole area AE detection value) and the luminance of the detected color region (the color AE detection value).

Note that, when the range of the set color component extends beyond a standard size, even when the target photographic subject (a face of a human subject, for example) is small, compared to when the range of the set color component is the standard size, the target area that can be detected is larger. Therefore, although the way of viewing the face of the human subject is the same in (B) in FIG. 7 and (B) in FIG. 6, the area that can be detected remains larger in (B) in FIG. 6. For that reason, (B) in FIG. 6, in the same way as (A) in FIG. 6, is an example in which the detected color region is equal to or greater than the ratio H % of the area of the whole photographic subject. As a result, in the cases of both (A) in FIG. 6 and (B) in FIG. 6, exposure control is performed such that the luminance of the region of the human face becomes the target luminance level and the person is adjusted to an appropriate brightness.

On the other hand, when the range of the set color component becomes smaller than the standard size, when the target photographic subject (a face of a human subject, for example) becomes small, compared to when the range of the set color component is the standard size, the target area that can be detected is smaller. Therefore, although the way of viewing the face of the human subject is the same in (B) in FIG. 7 and (B) in FIG. 8, the area that can be detected is smaller in (B) in FIG. 8. For that reason, (B) in FIG. 8, in the same way as (C) in FIG. 8, is an example in which the detected color region is equal to or smaller than the ratio L % of the area of the whole photographic subject. As a result, in the cases of both (B) in FIG. 8 and (C) in FIG. 8, the luminance of the whole photographic subject is determined as the current luminance level. As the window has a high luminance, the whole photographic subject becomes dark overall.

Note that in the example shown in (C) in FIG. 6, in the same way as (C) in FIG. 7, as the window has a high luminance, the whole photographic subject becomes dark overall, and a background wall is also substantially dark. However, if, for example, a small amount of a color similar to the set color component (skin color of a face of a human subject, for example) is included in the wall in the background, or if the range of the set color component is larger than the standard size, some of the wall color can be detected. As a result, the brightness of the background wall is not as dark as in (C) in FIG. 6, and is a brightness between that of (B) in FIG. 6 and that of (C) in FIG. 6. It is somewhat brighter due to the color detection AE process being able to somewhat avoid the influence of the window with a high luminance.

Furthermore, even when a color that is similar to the set color component (skin color of a face of a human subject, for example) is not included in the wall in the background, when white balance is obtained overall by fluorescent lighting, when the wall is white and lit by incandescent light, the image is displayed with a slightly red tinge. In this case, when the range of the set color component is larger than the standard size, in a situation in which there is a localized light source with a high luminance, such as a window, when the person moves within the screen (the detection area), fluctuations in the brightness of the screen can be alleviated, even if the person moves into and out of the screen (the detection area).

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-016002 filed in the Japan Patent Office on 27 Jan. 2009, the entire content of which is hereby incorporated by reference.

What is claimed is:

1. An imaging device comprising:
 a color component region detection portion that detects, from image data of a photographic subject, a region that has a same or a similar color component to a color component of a target photographic subject;
 an area calculation portion that calculates an area of the detected region;
 a luminance calculation portion that calculates luminance of the whole photographic subject and luminance of the detected region;
 a current luminance level determination portion that determines a current luminance level corresponding to the area of the detected region, using the luminance of the whole photographic subject and the luminance of the detected region; and
 an exposure amount calculation portion that calculates an amount of exposure such that the current luminance level becomes a target luminance level,
 wherein when the area of the detected region is equal to or less than a first predetermined area, the current luminance level determination portion determines, in correspondence with the area of the detected region, ratios of contribution of the luminance of the whole photographic subject and the luminance of the detected region, respectively, and determines the current luminance level by using the ratios and the luminance of the whole photographic subject and the luminance of the detected region.

2. The imaging device according to claim 1, wherein when the area of the detected region is equal to or greater than the first predetermined area, the current luminance level determination portion determines the current luminance level to be the luminance of the detected region.

3. The imaging device according to claim 1, wherein as the area of the detected region becomes smaller, the current luminance level determination portion determines the ratios such that the luminance of the whole photographic subject makes an increasingly higher contribution.

4. The imaging device according to claim 1, wherein when the area of the detected region is smaller than the first predetermined area and is equal to or less than a second predetermined area, the current luminance level determination portion determines the current luminance level to be the luminance of the whole photographic subject.

5. The imaging device according to claim 1, further comprising:

a region limiting portion that limits the detected region based on distribution of the luminance of the detected region, wherein when the area of the detected region is equal to or greater than the first predetermined area and is also equal to or greater than a third predetermined area which is larger than the first predetermined area, the current luminance level determination portion determines the current luminance level to be luminance of the limited region.

6. An imaging method, comprising the steps of:

detecting, from image data of a photographic subject, a region that has a same or a similar color component to a color component of a target photographic subject;

calculating an area of the detected region;

calculating luminance of the whole photographic subject and luminance of the detected region;

determining a current luminance level corresponding to the area of the detected region, using the luminance of the whole photographic subject and the luminance of the detected region; and calculating an amount of exposure such that the current luminance level becomes a target luminance level, wherein when the area of the detected region is equal to or less than a first predetermine area, the current luminance level determination portion determines, in correspondence with the area of the detected region, ratios of contribution of the luminance of the whole photographic subject the luminance of the detected region, respectively, and determines the current luminance level by using the ratios and the luminance of the whole photographic subject and the luminance of the detected region.

* * * * *